US011126705B2

(12) United States Patent
Agrawal et al.

(10) Patent No.: US 11,126,705 B2
(45) Date of Patent: Sep. 21, 2021

(54) SYSTEMS AND METHODS FOR USER AUTHENTICATION USING WORD-GESTURE PAIRS

(71) Applicant: MASTERCARD INTERNATIONAL INCORPORATED, Purchase, NY (US)

(72) Inventors: Rahul Agrawal, Pune (IN); Sudhir Gupta, Pune (IN)

(73) Assignee: Mastercard International Incorporated, New York, NY (US)

( * ) Notice: Subject to any disclaimer, the term of this patent is extended or adjusted under 35 U.S.C. 154(b) by 289 days.

(21) Appl. No.: 16/169,583

(22) Filed: Oct. 24, 2018

(65) Prior Publication Data

US 2019/0138708 A1 May 9, 2019

(30) Foreign Application Priority Data

Nov. 9, 2017 (SG) .......................... 10201709239Q

(51) Int. Cl.
| | |
|---|---|
| *G06F 21/36* | (2013.01) |
| *H04L 29/06* | (2006.01) |
| *G06K 9/00* | (2006.01) |
| *G06K 9/42* | (2006.01) |
| *G06F 3/01* | (2006.01) |
| *G06F 21/31* | (2013.01) |

(52) U.S. Cl.
CPC .............. *G06F 21/36* (2013.01); *G06F 3/017* (2013.01); *G06F 21/31* (2013.01); *G06K 9/00335* (2013.01); *G06K 9/00389* (2013.01); *G06K 9/42* (2013.01); *H04L 63/083* (2013.01); *G06F 2221/2103* (2013.01)

(58) Field of Classification Search
CPC .......... G06F 21/36; G06F 21/31; G06F 3/017; G06F 2221/2103; G06F 3/01; H04L 63/083; H04L 63/08; H04L 29/06; G06K 9/00335; G06K 9/42; G06K 9/00389; G06K 9/00
See application file for complete search history.

(56) References Cited

U.S. PATENT DOCUMENTS

| | | | |
|---|---|---|---|
| 8,693,726 B2 | 4/2014 | Karakotsios et al. | |
| 9,269,009 B1 * | 2/2016 | Liu | .......................... G06K 9/18 |
| 9,342,671 B2 | 5/2016 | Mankowski | |

(Continued)

*Primary Examiner* — Quazi Farooqui
(74) *Attorney, Agent, or Firm* — Pramudji Law Group PLLC; Ari Pramudji

(57) ABSTRACT

Data processing systems and methods for authenticating users and for generating user authentication indications is disclosed. In one embodiment, a data processing system for authenticating a user, comprises: a computer processor and a data storage device, the data storage device storing instructions operative by the processor to: receive a user indication identifying a user; receive an authentication indication for the user, the authentication indication comprising a sequence of word-gesture pair indications, each word-gesture pair indication comprising a word indication and a gesture indication; look up a stored authentication indication for the user; compare the received authentication indication with the stored authentication indication; and generate an authentication result indication indicating the result of the comparison.

14 Claims, 12 Drawing Sheets

(56) References Cited

U.S. PATENT DOCUMENTS

| | | | | |
|---|---|---|---|---|
| 10,140,882 B2* | 11/2018 | Fanty | ................. | G09B 19/00 |
| 2014/0289867 A1* | 9/2014 | Bukai | ................ | G06Q 20/4016 |
| | | | | 726/28 |
| 2015/0103136 A1 | 4/2015 | Anderson et al. | | |
| 2016/0085958 A1 | 3/2016 | Kang | | |
| 2016/0173494 A1 | 6/2016 | Carrizo et al. | | |
| 2017/0060251 A1 | 3/2017 | Choi | | |
| 2018/0293393 A1* | 10/2018 | Effendi | ............... | G06F 21/6209 |
| 2018/0337917 A1* | 11/2018 | Wallace | ............. | G06K 9/00892 |

\* cited by examiner

SYSTEMS AND METHODS FOR USER AUTHENTICATION USING WORD-GESTURE PAIRS

CROSS-REFERENCE TO RELATED APPLICATION

This application claims the benefit of and priority to Singapore Patent Application No. 10201709239Q, filed Nov. 9, 2017. The entire disclosure of the above application is incorporated herein by reference.

FIELD

The present disclosure generally relates to systems and methods for authenticating users.

BACKGROUND

This section provides background information related to the present disclosure which is not necessarily prior art.

User authentication is required in many scenarios. One example of a scenario in which users are authenticated is the authorization of payment transactions. One current user authentication method is to use a password. A problem with password authentication is that it can be difficult for a user to remember different passwords for multiple accounts. Other authentication techniques, such as biometric authentication, can avoid this problem, but require special hardware, such as fingerprint scanners, in order to read a user's biometric information.

Many user devices, such as smart phones and tablet computing devices, are provided with cameras. Gesture based control and operation of a mobile device is described in US Patent Application US 2017/0060251. There is no description or suggestion in the document of how gestures may be used to authenticate users.

US Patent Application US 2016/0173494 describes gesture based signature authentication in which a user can enter signatures through spoken words, the drawing of glyphs and movements of a mobile device. The frequency of the spoken words, and the timing of the drawing of the glyphs may be used to harden the signature.

A disadvantage of such an authentication system is that it may be hard for a user to recreate the signature themselves with timing that matches the originally entered signature. A further disadvantage is that the signature may be tied to a particular device and so a signature entered on a second device may not match a signature originally recorded on a first device due to differences in the sensors of the two devices.

US Patent Application US 2016/0085958 describes a system that uses hand recognition and gesture recognition to authenticate users. A user may be presented with a gesture challenge in response to which the user performs a predetermined hand gesture. Such a system requires large amounts of data to be analysed in order to authenticate a user based on an image of the hand of the user.

US Patent Application US 2015/0103136 describes systems and methods for multi-factor authentication in secure media based conferencing. The system uses authentication factors, such as user-specific facial recognition attributes, user-specific audio recognition attributes, acoustic environment attributes, acoustic environment attributes, user gesture attributes, technical attributes of the end point device and technical attributes of the media stream to determine an authentication score for a user end point device. Such a system lacks flexibility as many of the authentication factors are device or location specific.

U.S. Pat. No. 8,693,726 describes user identification by gesture recognition. A user is authenticated by analysing aspects of a motion or a gesture made by the user. This authentication method requires object tracking which may require complex processing on the user device.

U.S. Pat. No. 9,342,671 describes a form of touch-less gesture password using light intensity measurements from ambient light sensors. The authentication requires two or more ambient light sensors from which light intensity at respective locations are measured. Thus a device having the ambient light sensors is required for this type of authentication and it would therefore be limited to devices having such ambient light sensors.

None of the above prior art authentication systems describe how to provide efficient authentication in a user friendly manner which allows robust gesture based passwords to be entered and authenticated that is not tied to a specific device.

SUMMARY

This section provides a general summary of the disclosure, and is not a comprehensive disclosure of its full scope or all of its features. Aspects and embodiments of the disclosure are set out in the accompanying claims.

In accordance with a first aspect of the present disclosure there is provided a data processing system for authenticating a user. The data processing system comprises: a computer processor and a data storage device, the data storage device storing instructions operative by the processor to: receive a user indication identifying a user; receive an authentication indication for the user, the authentication indication comprising a sequence of word-gesture pair indications, each word-gesture pair indication comprising a word indication and a gesture indication; look up a stored authentication indication for the user; compare the received authentication indication with the stored authentication indication; and generate an authentication result indication indicating the result of the comparison.

In some embodiments, the gesture indications comprise images. The gesture indications may be images of the user or a part of the user. For example, the gesture indications may be images of a hand of the user.

In some embodiments, the word indications comprise a sequence of characters.

In an embodiment, the sequence of word gesture pair indications comprises a first-word gesture pair indication and a second word-gesture pair indication. The first word-gesture pair indication comprises a first word indication and a first gesture indication. The second word-gesture pair indication comprises a second word indication and a second gesture indication. The first word indication matches the second word indication and the first gesture indication differs from the second gesture indication.

In an embodiment the data storage device stores further instructions operative by the processor to: determine if an order of word-gesture pair indications of the received authentication indication matches an order of word-gesture pair indications of the stored authentication indication.

According to a second aspect of the present disclosure there is provided a data processing system for generating a user authentication indication for a user. The data processing system comprises a computer processor and a data storage device, the data storage device storing instructions operative by the processor to: receive a sequence of user input pairs, each user input pair comprising a first user input indicating a password and a second user input indicating a gesture; generate a sequence of word-gesture pair indications from the sequence of user inputs, each word-gesture pair indication comprising a word indication and a gesture indication; and generate a user authentication indication comprising the sequence of word-gesture pair indications.

In some embodiments each first user input comprises an indication of a sound signal and wherein the data storage device stores further instructions operative by the processor to: generate the sequence of word-gesture pair indications that comprises generating the word indications from the sound signals.

In some embodiments each second user input comprises an image sequence from a camera and wherein the data storage device stores further instructions operative by the processor to: generate the sequence of word-gesture pair indications that comprises generating the gesture indications as images from the image sequences.

In some embodiments the data storage device stores further instructions operative by the processor to: generate the gesture indications as images by generating normalized scale images from the video sequences.

In some embodiments the data storage device stores further instructions operative by the processor to: identify a target object in the image sequences; determine a contrast measure between the target object and a background in the image sequence; and generate the gesture indications as images from the image sequences if the contrast measure is above a threshold. The data storage device may store further instructions operative by the processor to: generate a user prompt to adjust the background if the contrast measure is below the threshold.

According to a third aspect of the present disclosure there is provided a method of authenticating a user. The method comprises receiving a user indication identifying a first user; receiving an authentication indication for the first user, the authentication indication comprising a first sequence of word-gesture pair indications, each word-gesture pair indication comprising a word indication and a gesture indication; looking up a stored authentication indication for the first user; comparing the received authentication indication with the stored authentication indication; and generating an authentication result indication indicating the result of the comparison.

In an embodiment, the method further comprises receiving a second authentication from a second user, the second user authentication indication comprising a second sequence of word-gesture pair indications, wherein the word indications of the second sequence of word gesture pair indications match the word indications of the first sequence of word-gesture indications and the gesture indications of the second sequence of word-gesture indications do not match the gesture indications of the first sequence of word gesture pair indications.

According to a fourth aspect of the present disclosure there is provided a method of generating a user authentication indication for a user. The method comprises receiving a sequence of user input pairs, each user input pair comprising a first user input indicating a password and a second user input indicating a gesture; generating a sequence of word-gesture pair indications from the sequence of user inputs, each word-gesture pair indication comprising a word indication and a gesture indication; and generating a user authentication indication comprising the sequence of word-gesture pair indications.

Embodiments of the disclosure may be expressed as a network of communicating devices (i.e., a "computerized network"). It may further be expressed in terms of a software application downloadable into a computer device to facilitate the method. The software application may be a computer program product, which may be stored on a non-transitory computer-readable medium on a tangible data-storage device (such as a storage device of a server, or one within a user device).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments of the disclosure will now be described by way of example only with reference to the following drawings, in which.

Corresponding reference numerals indicate corresponding parts throughout the several views of the drawings.

DETAILED DESCRIPTION

Embodiments of the present disclosure will be described, by way of example only, with reference to the drawings. The description and specific examples included herein are intended for purposes of illustration only and are not intended to limit the scope of the present disclosure.

Figure 1:
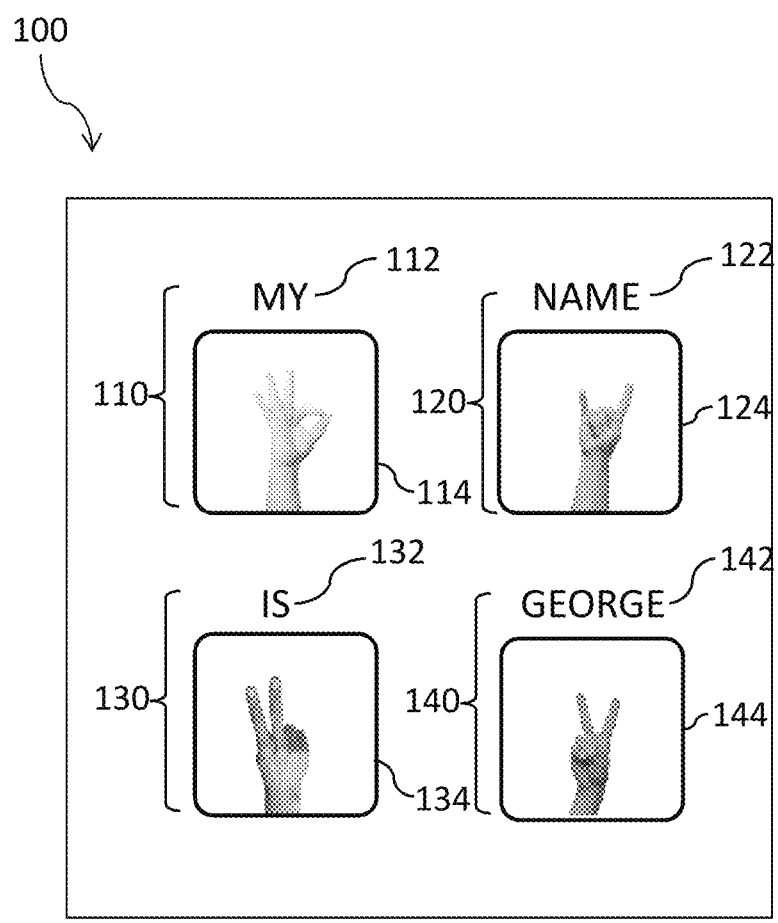
FIG. 1 illustrates an authentication indication according to an embodiment of the present disclosure.

FIG. 1 shows an authentication indication 100 according to an embodiment of the present disclosure. The authentication indication 100 is used in embodiments of the present disclosure as a form of password to authenticate a user. The authentication indication 100 comprises a plurality of word-gesture pair indications and in this example there are four word-gesture pair indications: a first word-gesture pair indication 110; a second word-gesture pair indication 120; a third word-gesture pair indication 130; and a fourth word-gesture pair indication 140. Each of the word-gesture pair indications comprises a word indication and a gesture indication. In this example, the word indications comprise a sequence of characters indicating a word and the gesture indications comprise images of a hand of the user forming a gesture. The first word-gesture pair indication 110 comprises the word "MY" 112 as the word indication and an image of the hand of the user forming a gesture 114 as the gesture indication. The second word-gesture pair indication 120 comprises the word "NAME" 122 and an image of the hand of the user forming a gesture 124. The third word-gesture pair indication 130 comprises the word "IS" 132 and an image of the hand of the user forming a gesture 134. The fourth word-gesture pair indication 140 comprises the word "GEORGE" 142 and an image of the hand of the user forming a gesture 144.

As described in the example above, the gesture indications comprise images of the hand of the user. However, other variations are envisaged in which the gesture indications comprise images of different parts of the user or the whole body of the user.

Figure 2:
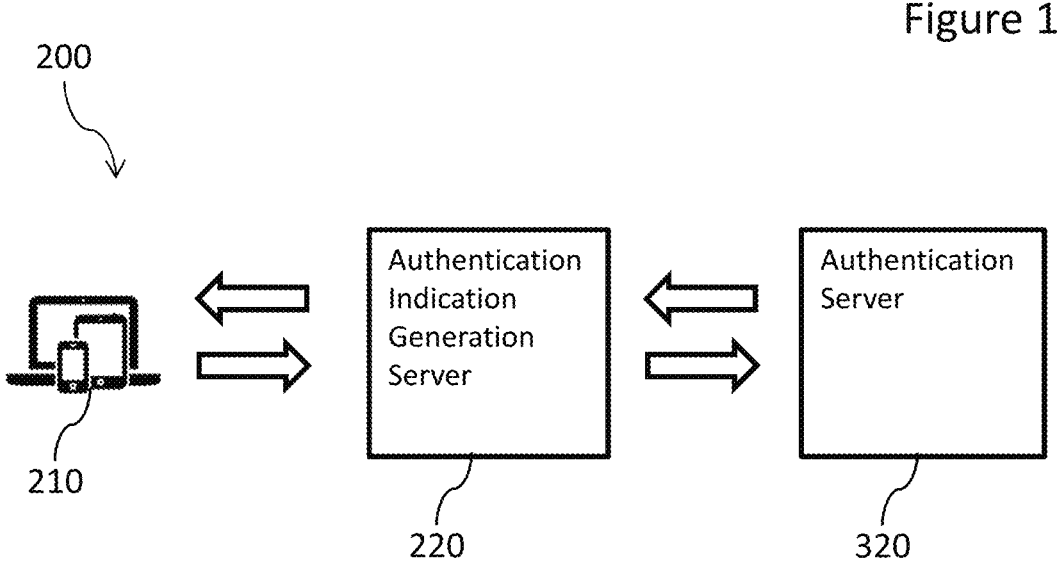
FIG. 2 is a block diagram showing a system for authenticating a user according to an embodiment of the present disclosure.

It is envisaged that in some embodiments, the authentication indications may be sent to an authentication server for authentication as electronic messages. In some embodiments, the authentication indications may be generated by an authentication indication generation server using information received from a user device. FIG. 2 shows such an embodiment. As described in more detail below with reference to FIG. 7, in a payment processing system, the authentication indication generation server may be implemented as part of a payment gateway operated by an acquirer bank or by a payment network. The authentication server which compares the authentication indications with stored authentication data may be operated by a payment card issuer.

FIG. 2 is a block diagram showing a system for authenticating a user according to an embodiment of the present disclosure. The system 200 comprises a user device 210 which communicates with an authentication indication generation server 220. The authentication indication generation server 220 communicates with an authentication server 320. The communications between the devices shown in FIG. 2 may be sent over a network, such as the internet, using wireless data transfer, for example, over a Wi-Fi or mobile internet network. The communications may be sent using a secure communications protocol, such as secure sockets layer (SSL).

The user device 210 may be, for example, a smart phone device, a tablet computing device or a laptop device. The user device 210 is equipped with a camera and a microphone which are operable to capture images or video sequences of the user and sounds or words spoken by the user. In some embodiments, the user device 210 captures a video sequence of the user and sound signals from the user and sends these to the authentication generation server 220 which processes the received data to generate an authentication indication, such as that described above with reference to FIG. 1. This authentication indication is then sent to the authentication server 320 which compares the received authentication indication with a stored authentication indication for the user and generates an authentication response indicating the result of the comparison.

In some embodiments, the authentication indication is used to authenticate a user as part of the authorization of a payment transaction. This scenario is described in more detail below with reference to FIG. 7. Alternatively, the authentication indication may be used in other scenarios in which the identity of a user must be authenticated, for example, to log in to a website or computer network or to access a physical location, for example, through an electronically controlled door.

Figure 3:
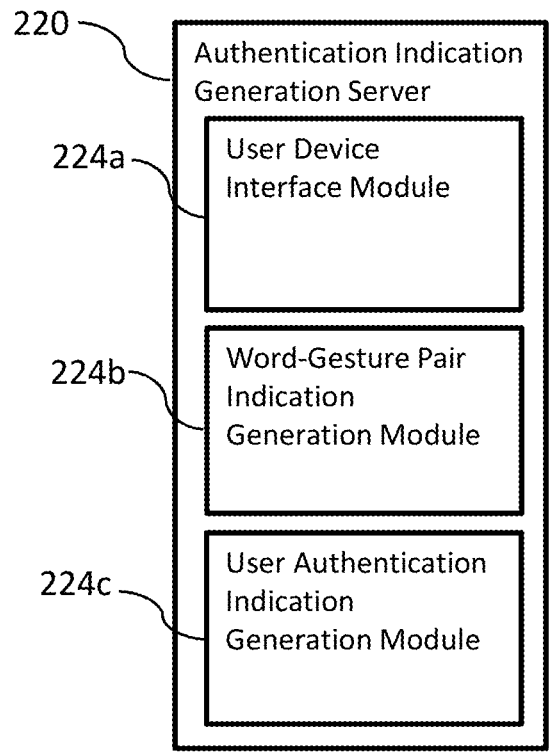
FIG. 3 is a block diagram showing the functional modules of the authentication indication generation server shown in FIG. 2.

FIG. 3 is a block diagram showing the functional modules of the authentication indication generation server 220 shown in FIG. 2. As shown in FIG. 3, the authentication indication generation server 220 comprises a user device interface module 224a; a word-gesture pair indication generation module 224b and a user authentication indication generation module 224c. A technical architecture of the authentication indication generation server is described in detail below with reference to FIG. 13.

Figure 4:
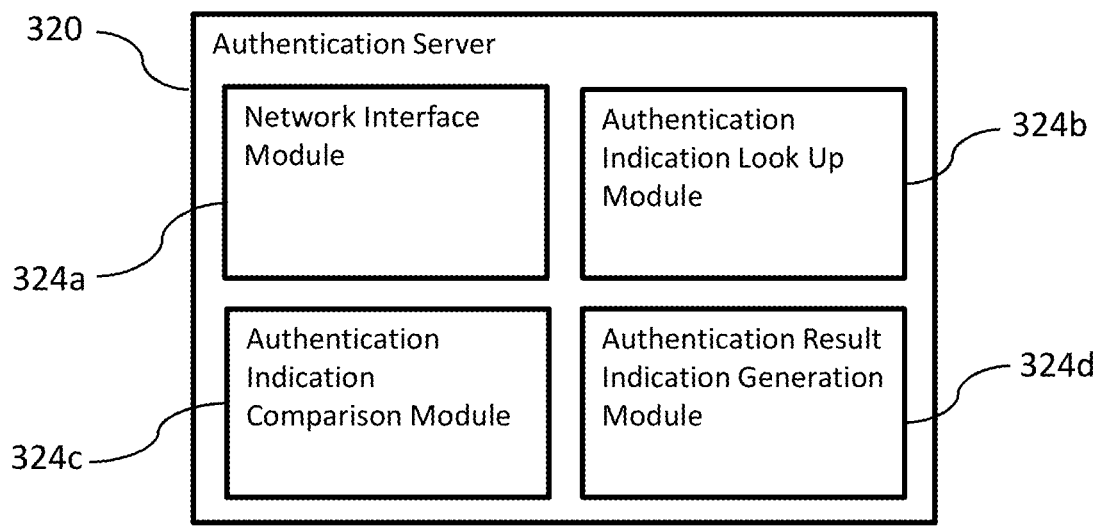
FIG. 4 is a block diagram showing the functional modules of the authentication server shown in FIG. 2.

FIG. 4 is a block diagram showing the functional modules of the authentication server 320 shown in FIG. 2. As shown in FIG. 4, the authentication server 320 comprises a network interface module 324a, an authentication indication look up module 324b, an authentication indication comparison module 324c, and an authentication result indication generation module 324d. A technical architecture of the authentication server is described in more detail below with reference to FIG. 14.

Figure 5:
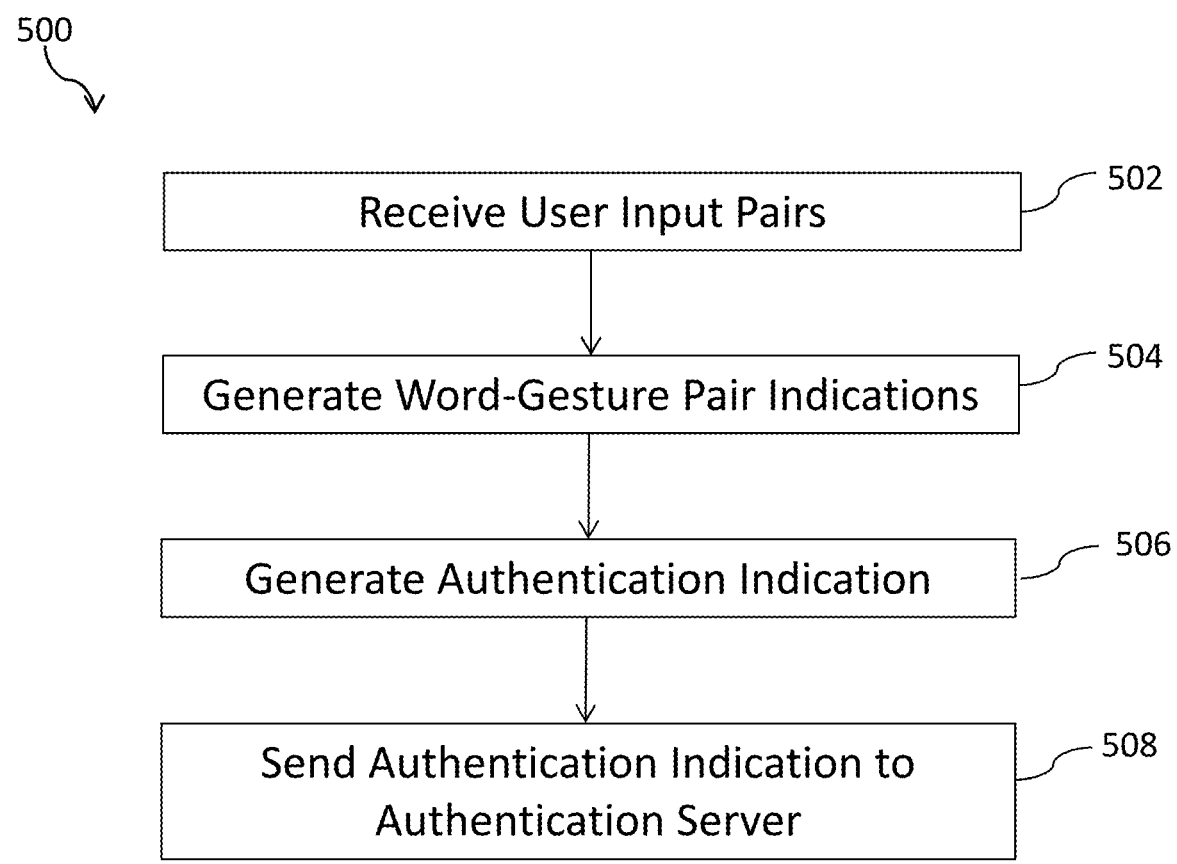
FIG. 5 is a flowchart illustrating a method of generating an authentication indication according to an embodiment of the present disclosure.

FIG. 5 is a flowchart illustrating a method of generating an authentication indication according to an embodiment of the present disclosure. The method 500 is carried out by the authentication indication generation server 220 illustrated in FIG. 3. In step 502, the user device interface module 224a of the authentication indication generation server 220 receives a plurality of user input pairs. Each of the user input pairs comprise a word indication and a gesture indication. Thus the input comprises a combination of a gesture and a password. In some embodiments, the user device 210 may process signals received from the microphone and camera and generate the word indication as a set of characters and the gesture indication as an image. In other embodiments, the user device interface module 224a of the authentication indication generation server 220 may process signals received from the microphone and camera of the user device 210 to determine a set of characters and an image. Thus the user input pairs may be considered to be the sound signal and video sequence or set of images received from the user device 210.

In step 504, the word-gesture pair indication generation module 224b of the authentication indication generation server 220 generates word-gesture pairs from the user inputs received in step 502. As discussed above, the user inputs may comprise sound and video signals. Thus step 504 may comprise applying a speech recognition algorithm to the sound signals to determine a word. Similarly, the step 504 may also comprise analyzing frames of a video sequence to identify a part of the user, such as the user's hand, and generating a gesture indication as an image of the user's hand.

In step 506, the user authentication indication generation module 224c of the authentication indication generation server 220 generates an authentication indication. The authentication indication comprises the plurality of word-gesture pair indications generated in step 506.

In step 508, the authentication indication generation server 220 sends the authentication indication to the authentication server 320.

Figure 6:
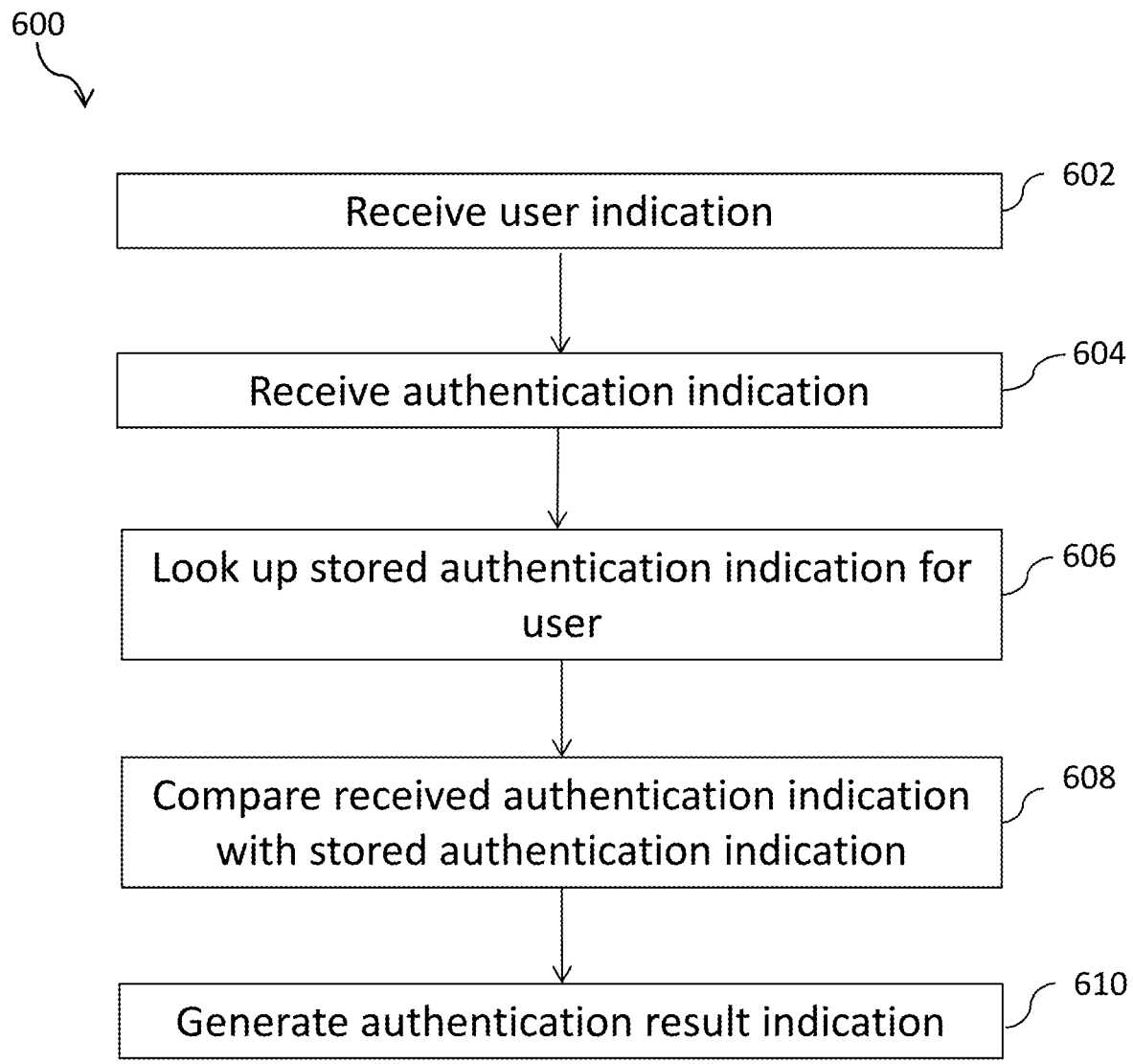
FIG. 6 is a flowchart illustrating a method of authenticating a user according to an embodiment of the present disclosure.

FIG. 6 is a flowchart illustrating a method of authenticating a user according to an embodiment of the present disclosure. The method 600 is carried out by the authentication server 320 illustrated in FIG. 4. In step 602, the network interface module 324a of the authentication server 320 receives a user indication. The user indication may be, for example, a user name or user identifier. In some examples, the user identifier may be an identifier of a user account, such as an account number, a payment card number or a customer number. In step 604, the network interface module 324a of the authentication server 320 receives the authentication indication. The authentication indication may take the form described above in relation to FIG. 1.

In step 606, the authentication indication look up module 324b of the authentication server 320 looks up a stored authentication indication for the user. This step may involve using the user indication as a key to search a database of stored authentication indications.

In step 608, the authentication indication comparison module 324c of the authentication server 320 compares the received authentication indication with the stored authentication for the user. This comparison may comprise determining if there is a match between each of the word indications of the received authentication indication with the respective word indications of the stored authentication indication. It is noted that the order of the word indications is therefore a feature of the authentication since if the order is changed then there would no longer be a match. For the gesture indications, the comparison may comprise determining a similarity or distance measure between respective gesture indications of the received authentication indication and the corresponding gesture indications of the stored authentication indication. In some embodiments the gesture indications may be converted to a fixed resolution. The image properties of the gesture indications may also be normalized, for example, by converting the image to a greyscale image and setting the contrast and brightness of the image to standard values. Such normalization would remove device dependent properties of the images and allow images or video sequences captured from different devices to be processed.

In step 608, the authentication indication comparison module 324c of the authentication server 320 may derive words from the gesture indications using a look-up table which may be derived from the stored authentication indication for the user. Then, once words have been derived from the gesture indications, the derived words are compared with the words of the authentication indication.

In step 610, the authentication result indication generation module 324d of the authentication server 320 generates an authentication result indication. The authentication result indication indicates whether the user has been successfully authenticated. Thus, the authentication result indication may indicate positive a match if all of the word and gesture indications of the received authentication indication match the respective word and gesture indications of the stored authentication indication. Conversely, the authentication result indication may indicate a negative result if one or more of the word and gesture indications of the received authentication do not match the respective word and gesture indications of the stored authentication indication.

Figure 7:
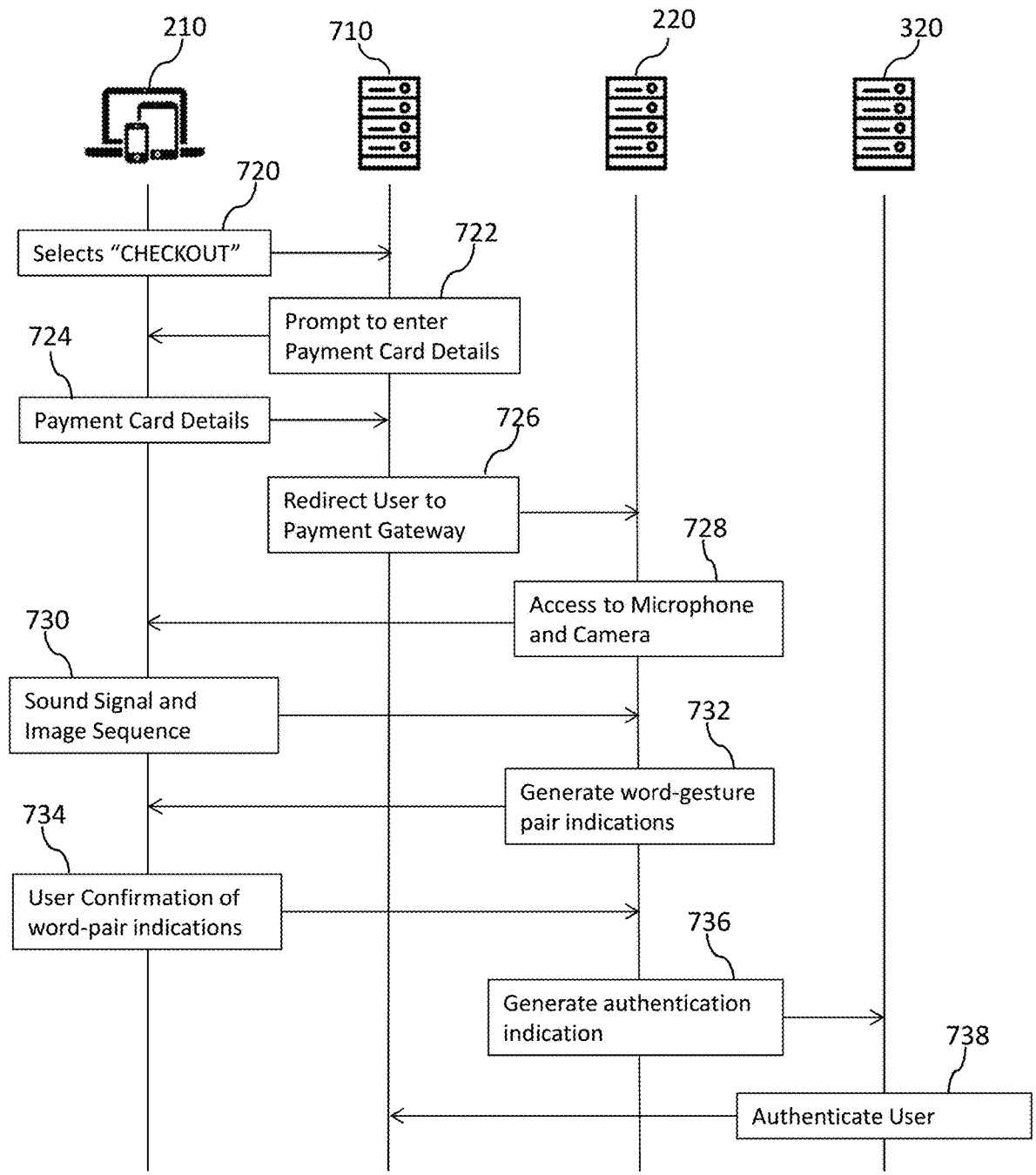
FIG. 7 shows message flows in an embodiment of the present disclosure relating to authentication of a user in an on-line payment transaction.

FIG. 7 shows message flows in an embodiment of the present disclosure relating to authentication of a user in an on-line payment transaction.

In this example scenario, a user of a user device 210 is using the user device 210 to access an electronic commerce website provided by a merchant server 710.

Once the user has selected items to purchase, he selects a "CHECKOUT" option 720 in a browser or application provided by the user device 720. In response to the user selecting the "CHECKOUT" option 720, the merchant server 710 generates a prompt to enter payment card details 722. The prompt to enter payment card details 722 is sent to the user device 210. In response to the prompt to enter payment card details 722, the user enters his payment card details 724. For example, the user may enter the payment card account number, expiry date and other details. On receiving the payment card details 724, the merchant server 710 redirects the user 726 to a payment gateway server which functions as an authentication indication generation server 220. This redirection may take place as a result of the merchant server identifying that the payment card of the user corresponds to a particular payment network and redirects the user to a payment gateway corresponding to that payment network.

The payment gateway which functions as the authentication indication generation server 220 provides the user with the option to authenticate himself with a word-gesture password. If the user selects this option, then the authentication indication generation server 220 requests access 728 to the microphone and camera of the user device 210. The payment gateway may be provided by a payment network, such as the Banknet system provided Mastercard® International Incorporated.

In response to the access request 728, the user device 210 may provide a prompt to the user to allow access by the authentication indication generation server 220 to the microphone and camera of the user device 210 in order to allow the user to enter a word-gesture password.

The user is then prompted to enter his word and gesture passwords. This process comprises the user device sending a sound signal and image sequence to the authentication indication generation server 220. In some embodiments, the user may be first prompted to enter a word and then prompted to enter a gesture. This process may repeat a number of times until a sequence of word gesture pairs have been entered by the user.

Figure 9:
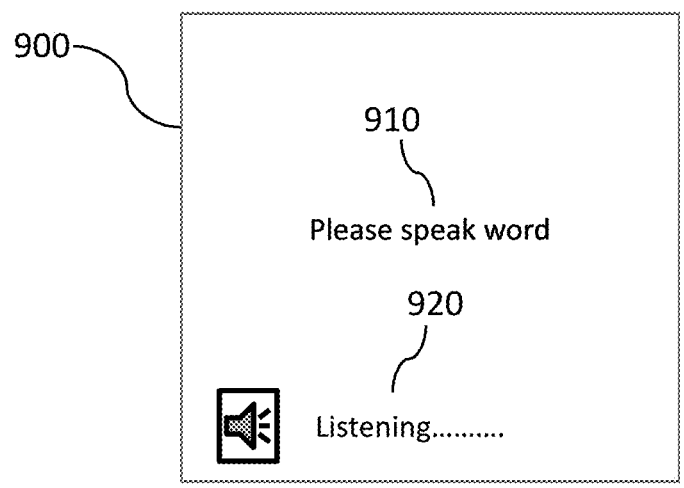
FIG. 9 shows an example screen for entry of a word indication in an embodiment of the present disclosure.

FIG. 9 shows an example screen for entry of a word indication in an embodiment of the present disclosure.

As shown in FIG. 9, the screen 900 displays an instruction 910 to the user to speak a word. The screen 900 also displays an indication 920 that the word is being recorded. As described above, the authentication indication generation server 220 may control the recording of the sound signal. Thus, the authentication indication generation server 220 may perform speech recognition on the sound signal to generate a word from the sound signal.

Figure 10:
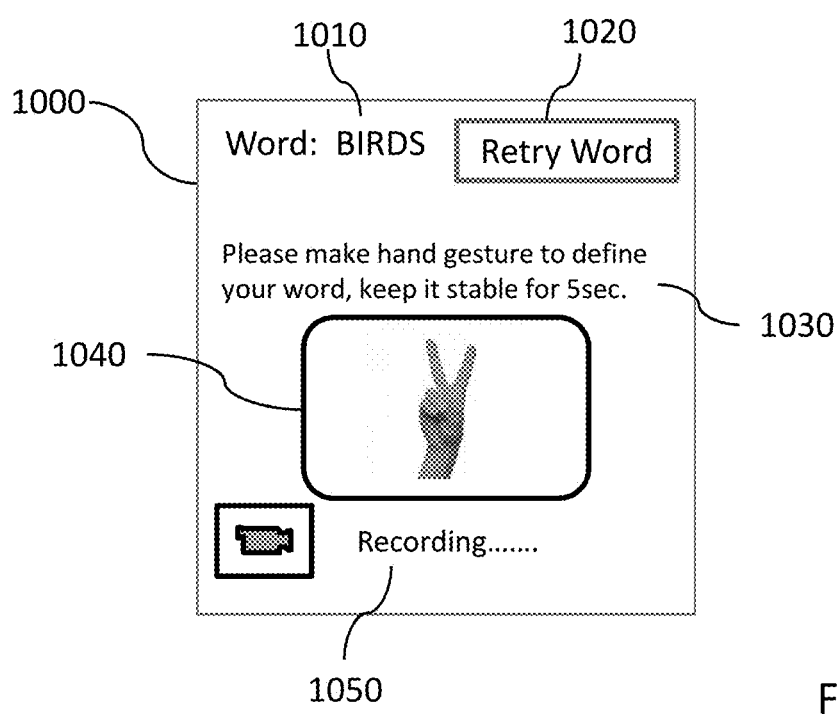
FIG. 10 shows an example screen for entry of a gesture indication in an embodiment of the present disclosure.

FIG. 10 shows an example screen for entry of a gesture indication in an embodiment of the present disclosure.

As shown in FIG. 10, the screen 1000 displays an indication 1010 of the word entered by the user. In this case, the user has previously entered the word "BIRDS" and is now entering a corresponding gesture. The screen 1000 displays an option to "Retry Word" 1020 and instructions 1030 on how to enter the gesture indication. An indication of the image 1040 captured by the camera of the user device 210 and an indication 1050 that the gesture indication is being recorded.

In order for the gesture to be recorded, the user may have to hold his hand still for a period, for example 5 seconds as indicated in FIG. 10, to allow the gesture to be captured. In some embodiments, other user indications may be displayed to assist the capture of the gesture indication. For example, if the background of the captured image is too noisy to allow the user's hand to be identified or if there is not enough contrast between the user's hand and the background, then the user may be prompted to change the background.

Returning now to FIG. 7, the authentication indication generation server 220 receives the sound signal and image sequence 730 generated on the user device 210. As described above, the sound signal may be generated first, then the word indication is generated from the sound signal, then the image sequence is received, and the gesture indication is generated from the image sequence. Thus word-gesture pair indications 732 are generated. A sequence of word-gesture pair indications may be generated by this process.

Figure 11:
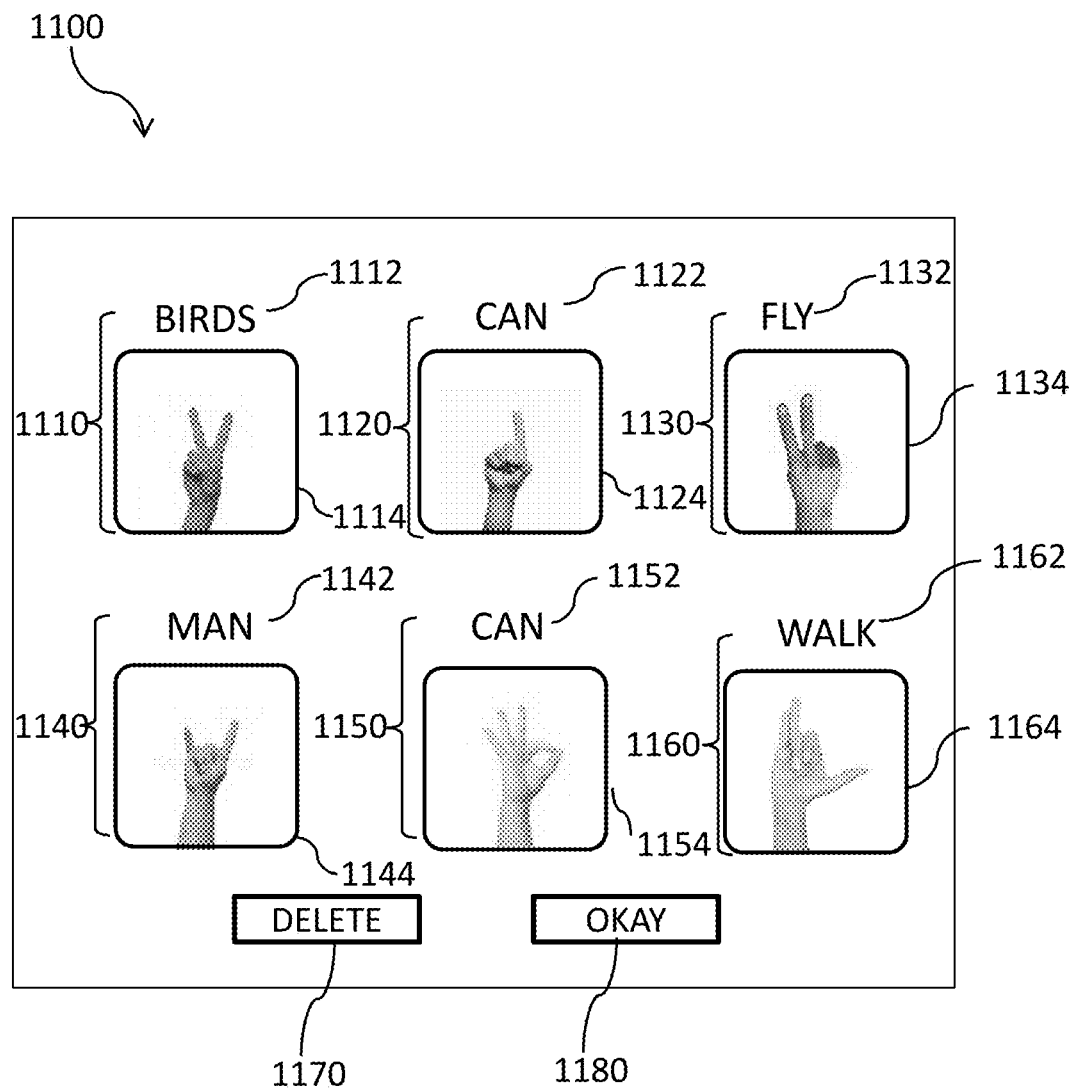
FIG. 11 shows an example screen for providing a sequence of word-gesture pair indications to a user in an embodiment of the present disclosure.

Then the word gesture pair indications 732 are sent to the user device 210. FIG. 11 shows an example screen for providing a sequence of word-gesture pair indications to a user in an embodiment of the present disclosure.

As shown in FIG. 11, the example screen 1100 shows a sequence of six word-gesture pair indications. The first word-gesture pair indication 1110 comprises a word indication 1112 "BIRDS" and a corresponding gesture indication 1114. The second word-gesture pair indication 1120 comprises a word indication 1122 "CAN" and a corresponding gesture indication 1124. The third word-gesture pair indication 1130 comprises a word indication 1132 "FLY" and a corresponding gesture indication 1134. The fourth word-gesture pair indication 1140 comprises a word indication 1142 "MAN" and a corresponding gesture indication 1144. The fifth word-gesture pair indication 1150 comprises a word indication 1152 "CAN" and a corresponding gesture indication 1154. The sixth word-gesture pair indication 1160 comprises a word indication 1162 "WALK" and a corresponding gesture indication 1164.

The display screen 1100 also displays a user option "DELETE" 1170 which the user may select to cancel the entered word-gesture pair indications and user option "OKAY" 1180 which the user may select to proceed to the next steps.

It is noted that in the example shown in FIG. 11, there are two word-gesture pair indications which include the word "CAN" however the gestures in these two word-gesture pair indications are different. Further, it is noted that there is no correlation in the meaning between the word and gesture in the word-gesture pair indications.

Returning again to FIG. 7, if the user wishes to proceed with the authentication process, he can provide a user confirmation 734 of the word-gesture pair indications. This may be provided by selecting the option "OKAY" 1180 illustrated in FIG. 11.

The user confirmation is sent from the user device 210 to the authentication indication generation server 220. In response to receiving the user confirmation 734, the authentication indication generation server 220 generates an authentication indication 736 which comprises indications of the word-gesture pair indications. The authentication indication generation server 220 then sends the authentication indication 736 to the authentication server 320. An indication of a user identifier for the user is also sent to the authentication server 320. The indication of the user identifier may the payment card account number entered by the user.

The authentication server 320 uses the user identifier to look up a stored authentication indication for the user and compares this with the received authentication indication. If the authentication indications match then the authentication server 320 generates a signal 738 to authenticate the user. In this example, the signal 738 may be a transaction authorization response sent to the merchant server 710 to indicate that the payment transaction is approved.

Figure 8:
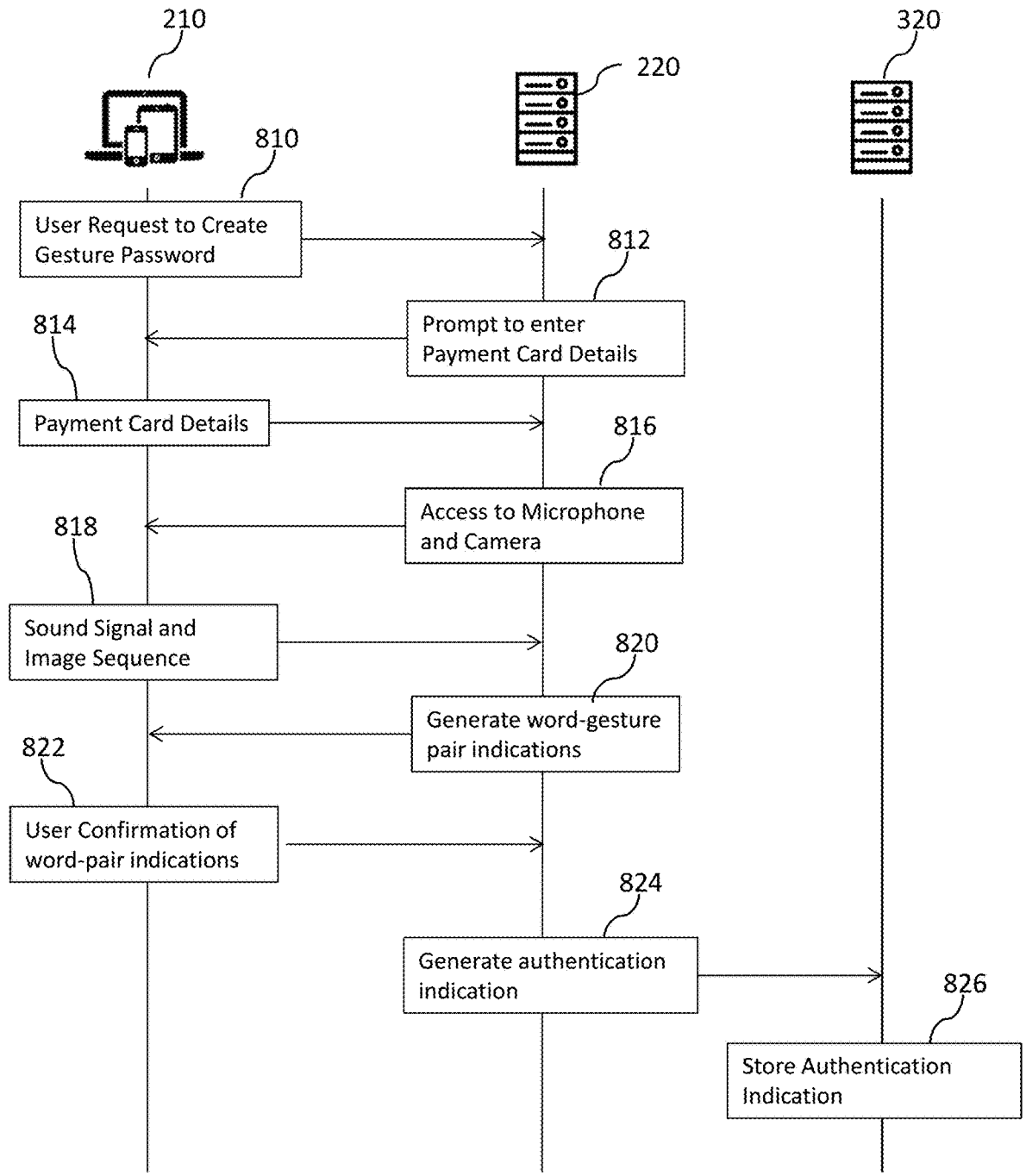
FIG. 8 shows message flows in a method of generating a gesture password according to an embodiment of the present disclosure.

FIG. 8 shows message flows in a method of generating a gesture password according to an embodiment of the present disclosure.

In this scenario, a user is setting up a word-gesture based password to be used with a payment card. Initially, the user of the user device 210 enters a request 810 to create a gesture password. The request 810 is sent to the authentication indication generation server 220. In response to the request 812, the authentication indication generation server 220 generates a prompt 812 for the user to enter payment card details. The prompt 812 is sent to the user device 210.

In response to the prompt 812, the user enters payment card details 814 which are sent to the authentication indication generation server 220. Then, the authentication indication generation server 220 requests access 816 to the microphone and camera of the user device 210.

In response to the access request 816, the user device 210 may provide a prompt to the user to allow access by the authentication indication generation server 220 to the microphone and camera of the user device 210 in order to allow the user to enter a word-gesture password.

The user is then prompted to enter his word and gesture passwords. This process is as described above in relation to FIG. 7. The user may be promoted by screens, such as those shown in FIG. 9 and FIG. 10, to enter word and gesture passwords. Sound signals and image sequences 818 are sent from the user device 210 to the authentication indication generation server 220. In response to the sound signals and image sequences 818, the authentication indication generation server 220 generates word-gesture pair indications 820. The word-gesture pair indications 820 are sent to the user device 210. The user may be provided with an option to add additional word-gesture pair indications, or the user may be provided with a screen, as shown in FIG. 11, to indicated approval of the generated word-gesture pair indications. In response, the user provides confirmation 822 of the word-gesture pair indications. The confirmation 822 is sent by the user device 210 to the authentication indication generation server 220.

In response to the user confirmation 822, the authentication indication generation server 220 generates an authentication indication 824 for the user which is sent to the authentication server 320. An indication of the user payment card is also sent to the authentication server 320. The authentication server 320 stores the authentication indication with the payment card indication as a stored authentication indication 826.

As described above, embodiments of the present disclosure provide passwords based on word-gesture pairs. It is noted that even if two users have the same sequence of words in the word-gesture pairs, the corresponding gestures are different, then the authentication indications will not match. This is illustrated in FIGS. 12A and 12B.

Figure 12A:
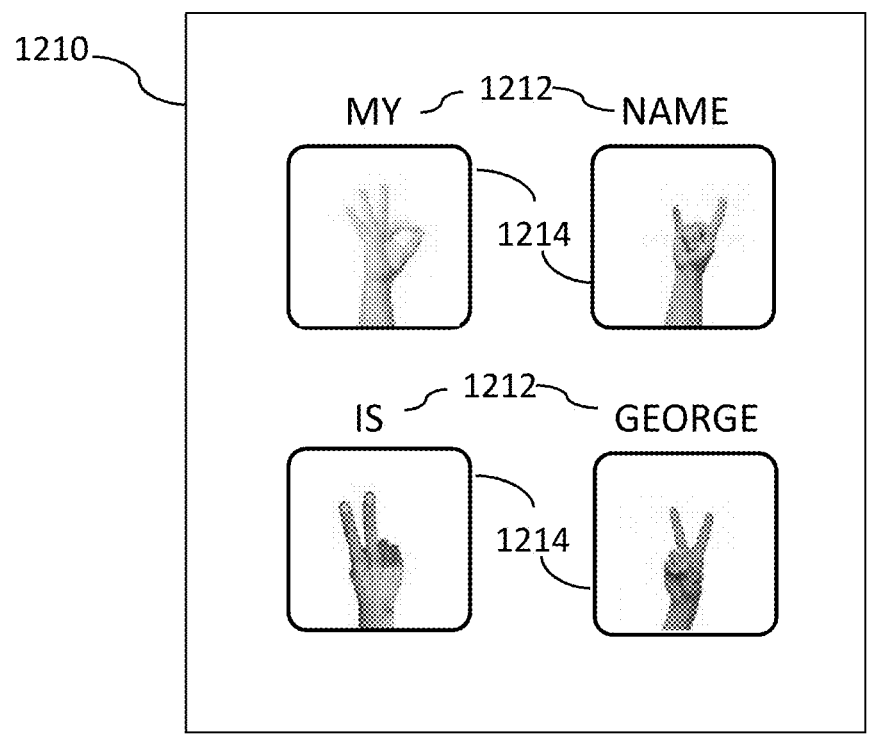
FIGS. 12A and 12B show example authentication indications used in embodiments of the present disclosure.
Figure 12B:
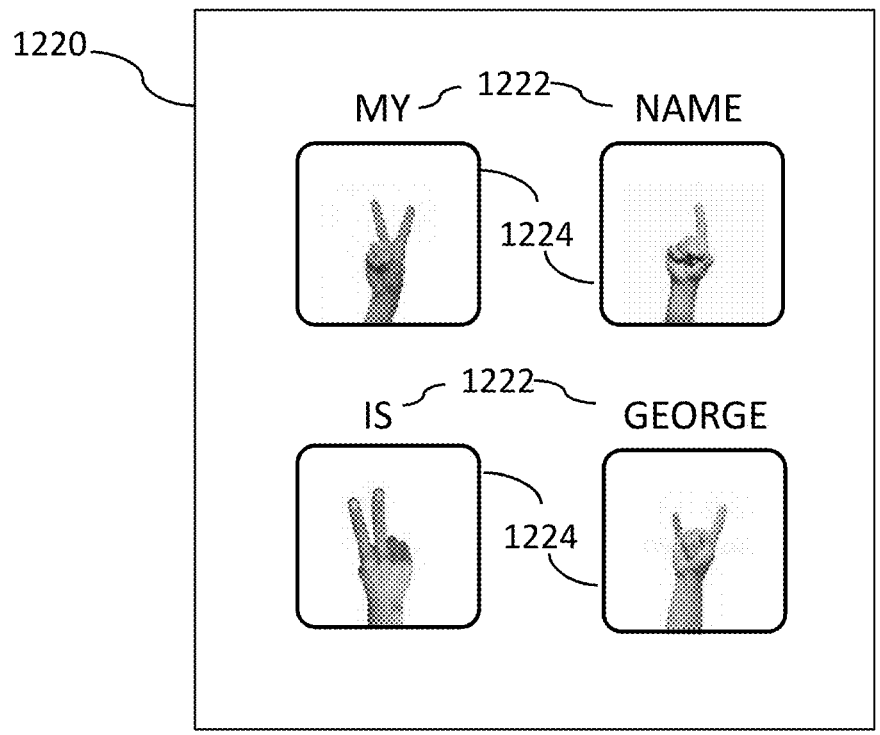

FIGS. 12A and 12B show example authentication indications used in embodiments of the present disclosure. As shown in FIG. 12A, a first authentication indication 1210 comprises four word-gesture pair indications. The words 1212 of the first authentication indication are "MY NAME IS GEORGE", and there is a corresponding sequence of gestures 1214.

As shown in FIG. 12B, a second authentication indication 1220 also comprises four word-gesture pair indications. The words 1222 of the second authentication indication 1220 are "MY NAME IS GEORGE" which is the same as the sequence of words for the first authentication indication 1210. However, the sequence of gestures 1224 of the second authentication indication 1220 is different from the sequence of gestures of the first authentication indication 1210. Therefore, even if two users happen to use the same word sequence, or if the word sequence of a user is compromised by the gesture sequence being different will prevent the first authentication indication 1210 from being usable to authenticate the second authentication indication 1220.

Figure 12C:
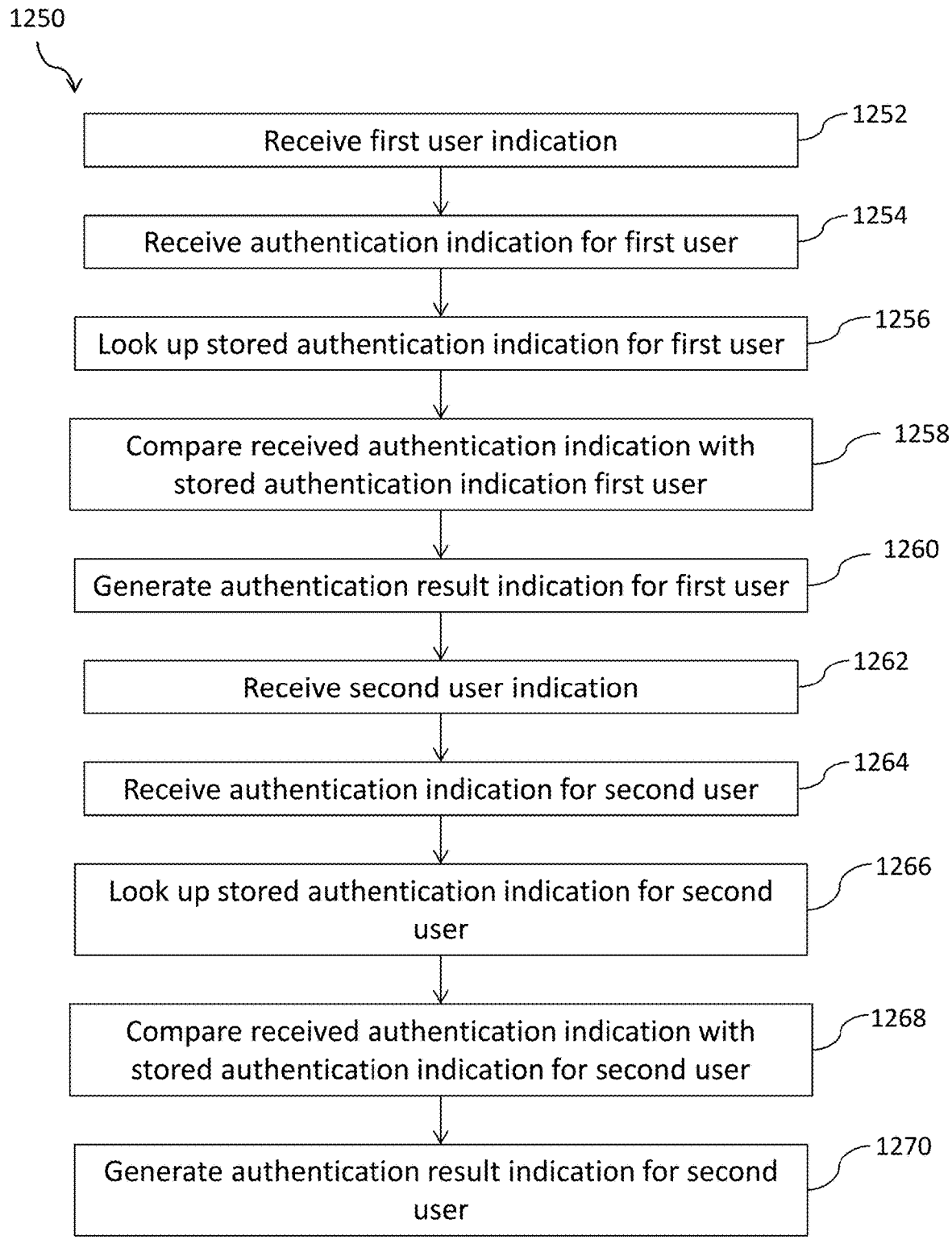
FIG. 12C is a flowchart showing a method of authenticating users according to an embodiment of the present disclosure.

FIG. 12C is a flowchart showing a method of authenticating users according to an embodiment of the present disclosure. In this example, two users have the same words in their authentication indications but have different gestures associated with the words. The method 1250 is carried out by the authentication server 320 illustrated in FIG. 4.

In step 1252, the network interface module 324a of the authentication server 320 receives a user indication from a first user. The user indication may be, for example, a user name or user identifier. In some examples, the user identifier may be an identifier of a user account, such as an account number, a payment card number or a customer number.

In step 1254, the network interface module 324a of the authentication server 320 receives an authentication indication for the first user. The in this example, authentication indication may takes the form described above in relation to FIG. 12A.

In step 1256, the authentication indication look up module 324b of the authentication server 320 looks up a stored authentication indication for the first user.

In step 1258, the authentication indication comparison module 324c of the authentication server 320 compares the received authentication indication for the first user with the stored authentication for the first user.

In step 1260, the authentication result indication generation module 324d of the authentication server 320 generates an authentication result indication. The authentication result indication indicates whether the user has been successfully authenticated. Thus, the authentication result indication may indicate positive a match if all of the word and gesture indications of the received authentication indication match the respective word and gesture indications of the stored authentication indication. Conversely, the authentication result indication may indication a negative result if one or more of the word and gesture indications of the received authentication do not match the respective word and gesture indications of the stored authentication indication.

In step 1262, the network interface module 324a of the authentication server 320 receives a user indication from a second user.

In step 1264, the network interface module 324a of the authentication server 320 receives an authentication indication for the second user which may take the form described above in relation to FIG. 12B.

In step 1266, the authentication indication look up module 324b of the authentication server 320 looks up a stored authentication indication for the second user.

In step 1268, the authentication indication comparison module 324c of the authentication server 320 compares the received authentication indication for the second user with the stored authentication for the second user.

In step 1270, the authentication result indication generation module 324d of the authentication server 320 generates an authentication result indication. In this example, the authentication result indication for the second user will only be positive if the correct word and gesture indications are entered for the second user. Thus if the second user were to attempt to authenticate themselves using the first user's authentication indication a negative authentication indication would be generated as the gesture indications would not match.

Figure 13:
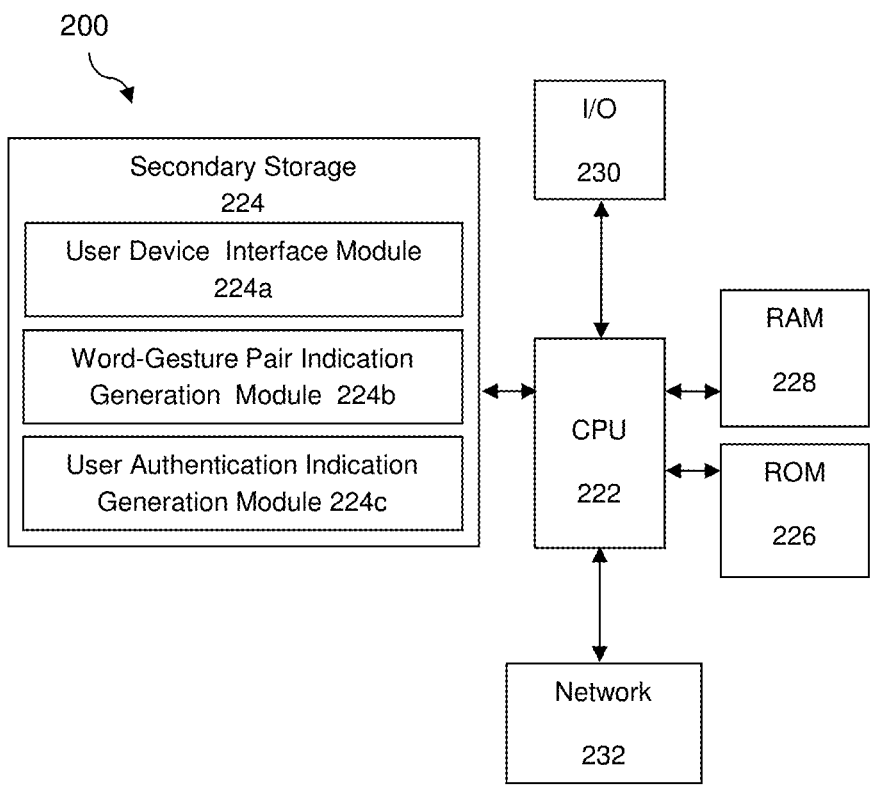
FIG. 13 is a block diagram showing a technical architecture of an authentication indication generation server according to an embodiment of the present disclosure.

FIG. 13 is a block diagram showing a technical architecture 200 of the authentication indication generation server 220 for performing steps of exemplary methods described above. Typically, the methods are implemented by a number of computers each having a data-processing unit. The block diagram as shown in FIG. 13 illustrates a technical architecture 200 of a computer which is suitable for implementing one or more embodiments herein.

The technical architecture 200 includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture 200 may further comprise input/output (I/O) devices 230, and network connectivity devices 232.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. In this embodiment, the secondary storage 224 has a user device interface module 224a, a word-gesture indication generation module 224b, and a user authentication indication generation module 224c, comprising non-transitory instructions operative by the processor 222 to perform various operations of the method of the present disclosure. As depicted in FIG. 13, the modules 224a-224c are distinct modules which perform respective functions implemented by the authentication indication generation server 220. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 224a-224c is described herein, these may alternatively be implemented as one or more hardware modules (such as field-programmable gate array(s) or application-specific integrated circuit(s)) comprising circuitry which implements equivalent functionality to that implemented in software. The ROM 226 is used to store instructions and perhaps data which are read during program execution. The secondary storage 224, the RAM 228, and/or the ROM 226 may be referred to in some contexts as computer readable storage media and/or non-transitory computer readable media.

The I/O devices may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols, such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the method operations described herein. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 200, at least one of the CPU 222, the RAM 228, and the ROM 226 are changed, transforming the technical architecture 200, in part, into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 14:
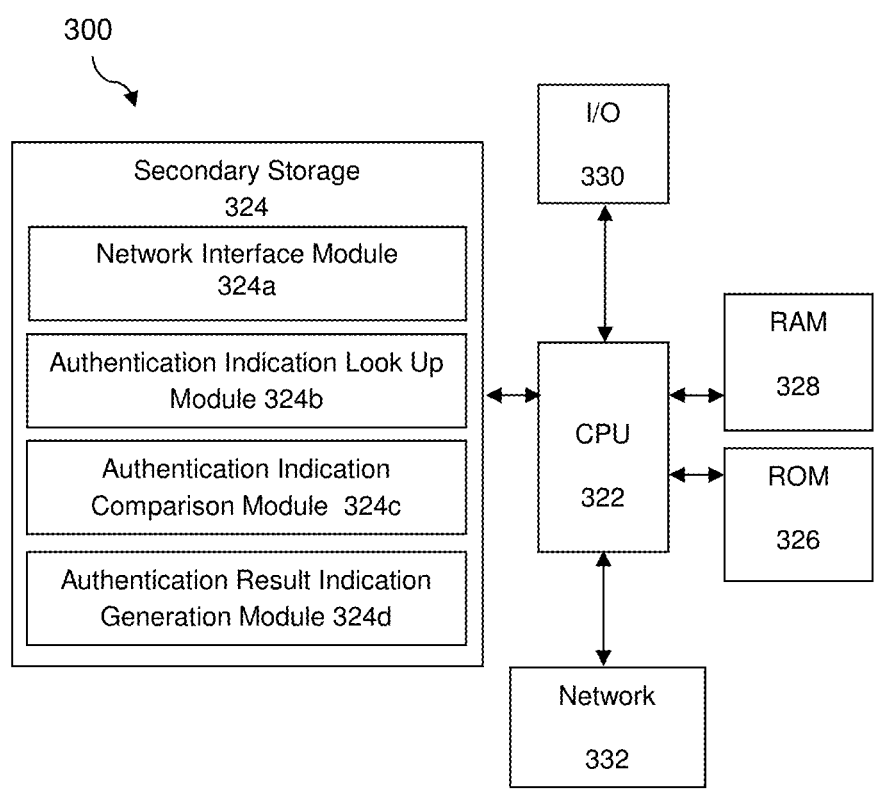
FIG. 14 is a block diagram showing a technical architecture of an authentication server according to an embodiment of the present disclosure.

FIG. 14 is a block diagram showing a technical architecture 300 of the authentication server 320 for performing steps of the methods described above. Typically, the methods are implemented by a number of computers each having a data-processing unit. The block diagram, as shown in FIG. 14, illustrates a technical architecture 300 of a computer which is suitable for implementing one or more embodiments herein.

The technical architecture 300 includes a processor 322 (which may be referred to as a central processor unit or CPU) that is in communication with memory devices including secondary storage 324 (such as disk drives), read only memory (ROM) 326, random access memory (RAM) 328. The processor 322 may be implemented as one or more CPU chips. The technical architecture 300 may further comprise input/output (I/O) devices 330, and network connectivity devices 332.

The secondary storage 324 is typically comprised of one or more disk drives or tape drives and is used for non-volatile storage of data and as an over-flow data storage device if RAM 328 is not large enough to hold all working data. Secondary storage 324 may be used to store programs which are loaded into RAM 328 when such programs are selected for execution. In this embodiment, the secondary storage 324 has a network interface module 324*a*, an authentication indication look up module 324*b*, an authentication indication comparison module 324*c*, and an authentication result indication generation module 324*d* comprising non-transitory instructions operative by the processor 322 to perform various operations of the method of the present disclosure. As depicted in FIG. 15, the modules 324*a*-324*d* are distinct modules which perform respective functions implemented by the authentication server 320. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 324*a*-324*d* is described herein, these may alternatively be implemented as one or more hardware modules (such as field-programmable gate array(s) or application-specific integrated circuit(s)) comprising circuitry which implements equivalent functionality to that implemented in software. The ROM 326 is used to store instructions and perhaps data which are read during program execution. The secondary storage 324, the RAM 328, and/or the ROM 326 may be referred to in some contexts as computer readable storage media and/or non-transitory computer readable media.

The I/O devices may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols, such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network, or might output information to the network in the course of performing the method operations described herein. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 300, at least one of the CPU 322, the RAM 328, and the ROM 326 are changed, transforming the technical architecture 300, in part, into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 300 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 300 to provide the functionality of a number of servers that is not directly bound to the number of computers in the technical architecture 300. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

Whilst the foregoing description has described exemplary embodiments, it will be understood by those skilled in the art that many variations of the embodiments can be made in accordance with the appended claims.

The reference to any prior art in this specification is not, and should not be taken as, an acknowledgment or any form of suggestion that the prior art forms part of the common general knowledge.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A data processing system for authenticating a user, the data processing system comprising:
   one or more first computer processor devices; and
   a first non-transitory data storage device, the first non-transitory data storage device storing instructions operative by the one or more first computer processor devices to:
   receive a user indication identifying a user;
   receive an authentication indication for the user, wherein the authentication indication comprises a sequence of word-gesture pair indications having a plurality of word indications and a plurality of gesture indications, and wherein each word-gesture pair indication comprises a respective word indication of the plurality of word indications and a respective gesture indication of the plurality of gesture indications;

look up a stored authentication indication for the user;

compare the received authentication indication with the stored authentication indication, comprising determine an order of the plurality of word indications, an order of word indications of the stored authentication indication, an order of the plurality of gesture indications, and an order of gesture indications of the stored authentication indication; and generate an authentication result indication based on the comparison.

2. The data processing system according to claim 1, wherein the plurality of gesture indications comprises images of the user, a part of the user, a hand of the user, or combinations thereof.

3. The data processing system according to claim 1, wherein the sequence of word-gesture pair indications comprises a first-word gesture pair indication and a second word-gesture pair indication, wherein the first word-gesture pair indication comprises a first word indication and a first gesture indication, wherein the second word-gesture pair indication comprises a second word indication and a second gesture indication, and wherein the first word indication matches the second word indication and the first gesture indication differs from the second gesture indication.

4. The data processing system according to claim 1, wherein the first non-transitory data storage device stores further instructions operative by the one or more first computer processor devices to: determine if an order of word-gesture pair indications of the received authentication indication matches an order of word-gesture pair indications of the stored authentication indication.

5. The data processing system according to claim 1, further comprising:

one or more second computer processor devices; and a second non-transitory data storage device, the second non-transitory data storage device storing executable instructions operative by the one or more second processor devices to:

receive a sequence of user input pairs, each user input pair comprising a first user input indicating a password and a second user input indicating a gesture;

generate the sequence of word-gesture pair indications from the sequence of user input pairs; and generate the authentication indication for the user comprising the sequence of word-gesture pair indications.

6. The data processing system according to claim 5, wherein each first user input comprises an indication of a sound signal and wherein the executable instructions are further operative by the one or more second processor devices to generate the plurality of word indications of the sequence of word-gesture pair indications from the sound signals.

7. The data processing system according to claim 5, wherein each second user input comprises an image sequence from a camera and wherein the executable instructions are further operative by the one or more second processor devices to generate the plurality of gesture indications of the sequence of word-gesture pair indications as images from the image sequences.

8. The data processing system according to claim 7, wherein the executable instructions are further operative by the one or more second processor devices to generate normalized scale images from the image sequences in order to generate the plurality of gesture indications of the word-gesture pair indications.

9. The data processing system according to claim 7, wherein the executable instructions are further operative by the one or more second processor devices to:

identify a target object in the image sequences;

determine a contrast measure between the target object and a background in the image sequences; and generate the plurality of gesture indications as images from the image sequences if the contrast measure is above a threshold.

10. The data processing system according to claim 9, wherein the executable instructions are further operative by the one or more second processor devices to generate a user prompt to adjust the background if the contrast measure is below the threshold.

11. The data processing system according to claim 1, wherein the instructions to compare the received authentication indication with the stored authentication indication further comprises instructions to:

determine if the order of the plurality of word indications matches the order of the word indications of the stored authentication indication; and determine if the order of the plurality of gesture indications matches the order of the gesture indications of the stored authentication indication.

12. A method of authenticating a user, the method comprising:

receiving a user indication identifying a first user;

receiving an authentication indication for the first user, wherein the authentication indication comprises a first sequence of word-gesture pair indications having a plurality of word indications and a plurality of gesture indications, and wherein each word-gesture pair indication comprises a respective word indication of the plurality of word indications and a respective gesture indication of the plurality of gesture indications;

looking up a stored authentication indication for the first user;

comparing the received authentication indication with the stored authentication indication, comprising determining an order of the plurality of word indications, an order of word indications of the stored authentication indication, an order of the plurality of gesture indications, and an order of gesture indications of the stored authentication indication; and generating an authentication result indication based on the comparison.

13. The method according to claim 12, wherein the plurality of gesture indications comprises images of the first user, a part of the first user, a hand of the first user, or combinations thereof.

14. The method according to claim 12, wherein comparing the received authentication indication with the stored authentication indication further comprises:

determining if the order of the plurality of word indications matches the order of the word indications of the stored authentication indication; and determining if the order of the plurality of gesture indications matches the order of the gesture indications of the stored authentication indication.

* * * * *